Figure 1:
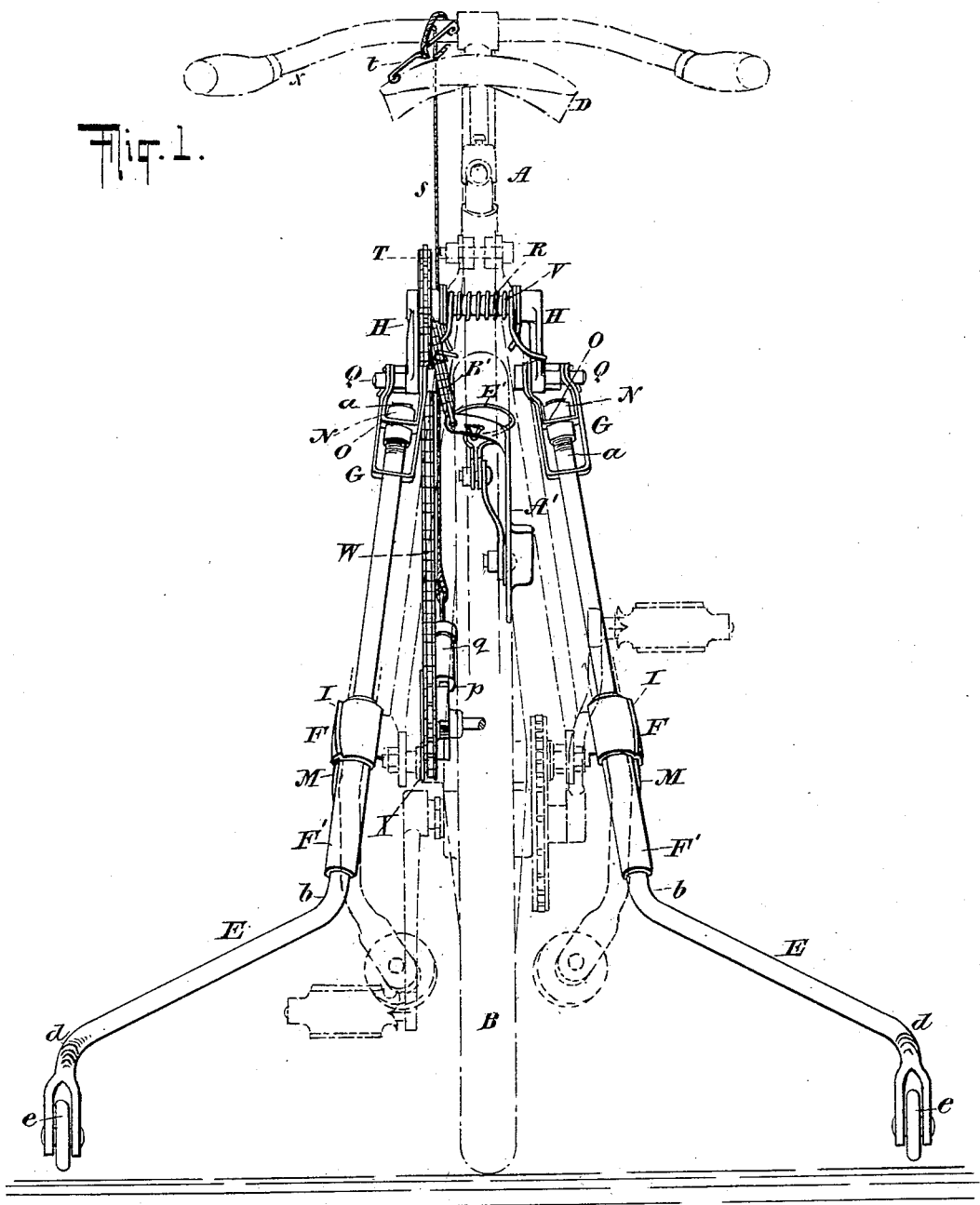

(No Model.) 3 Sheets—Sheet 1.
E. A. TRAPP.
BICYCLE SUPPORT.

No. 602,670. Patented Apr. 19, 1898.

WITNESSES:
John Kehlenbeck
G. Dieterich

INVENTOR
Edward A. Trapp
BY
Chas. C. Gill
ATTORNEY.

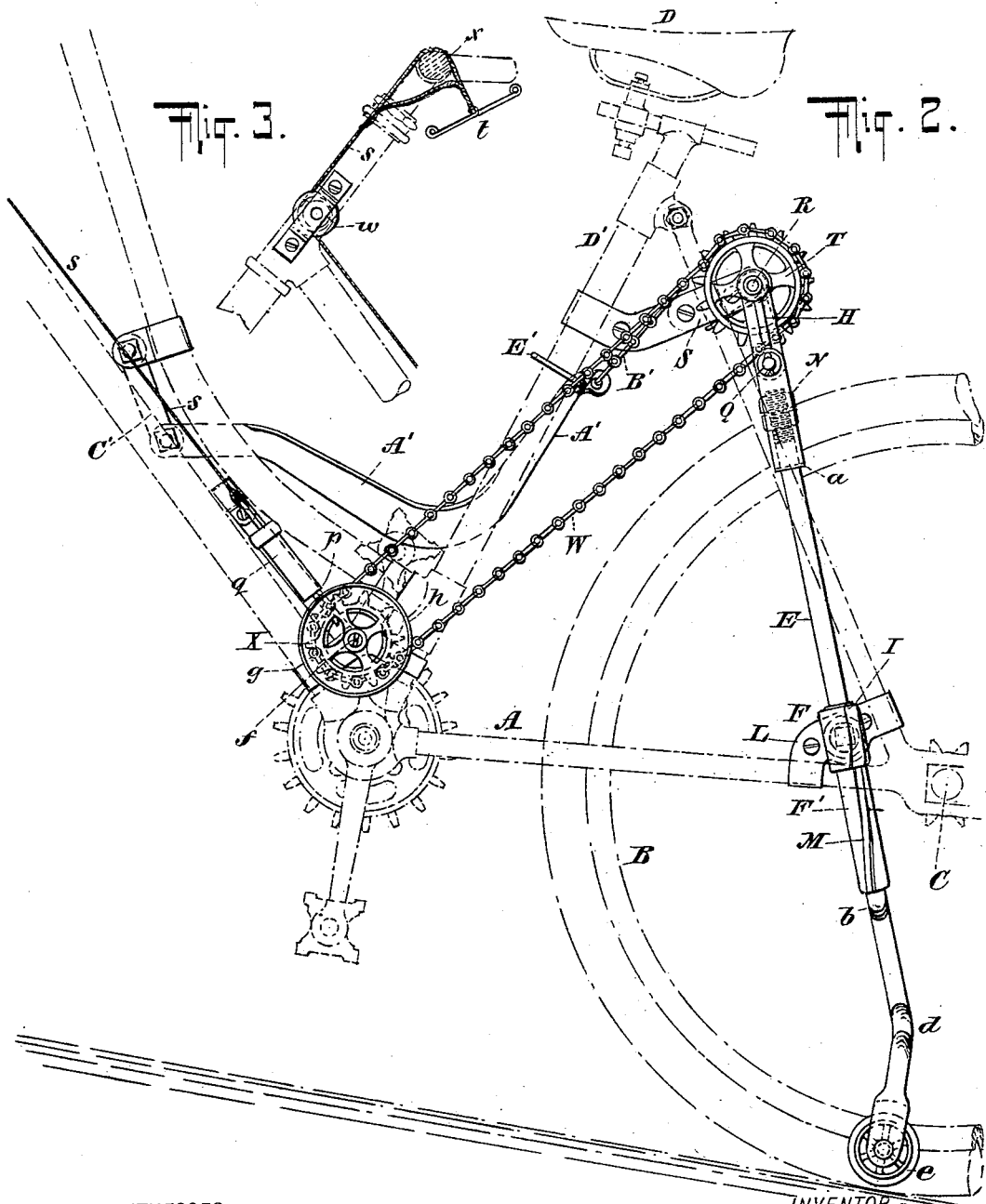

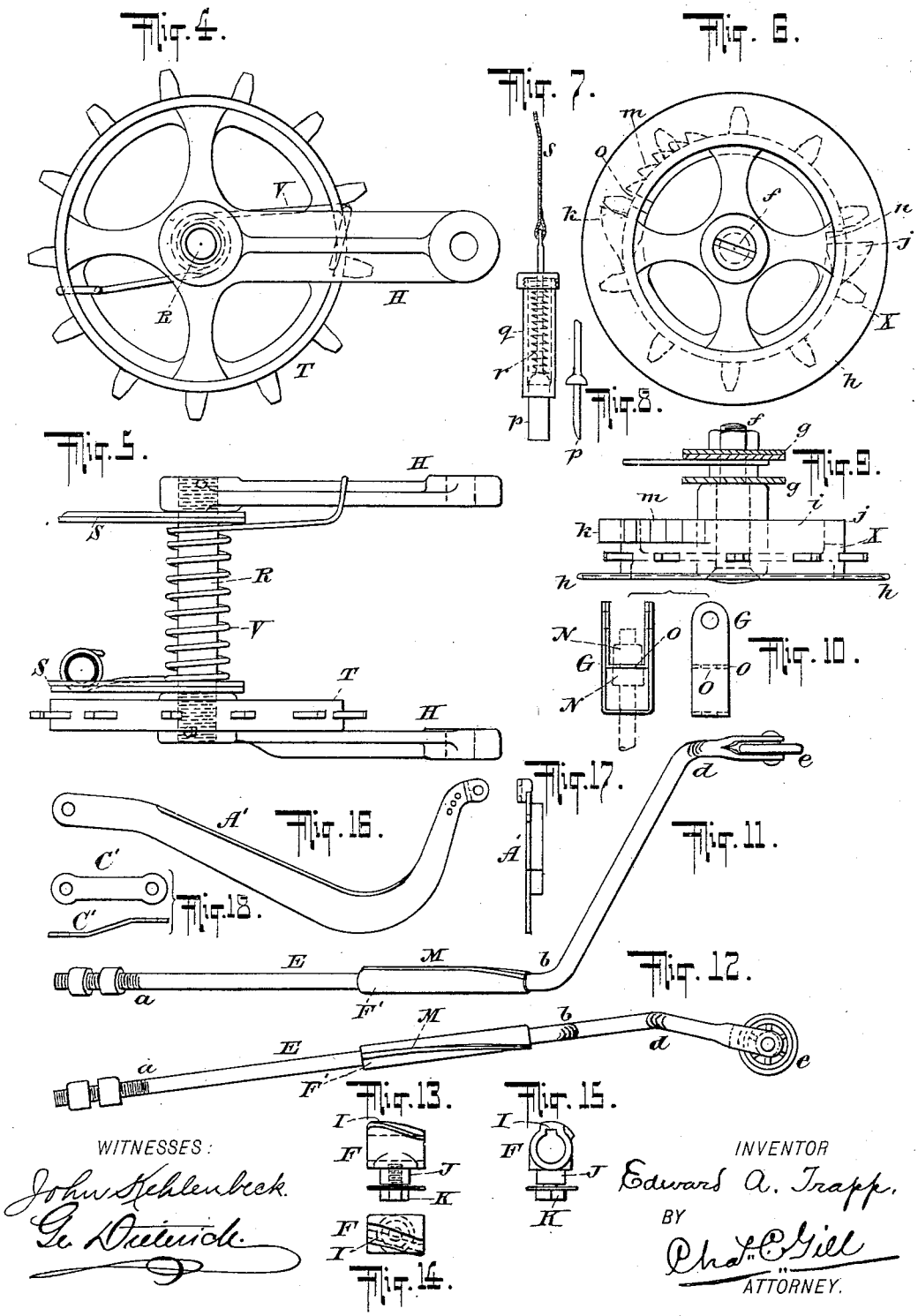

UNITED STATES PATENT OFFICE.

EDWARD A. TRAPP, OF NEW YORK, N. Y.

BICYCLE-SUPPORT.

SPECIFICATION forming part of Letters Patent No. 602,670, dated April 19, 1898.

Application filed February 4, 1897. Serial No. 621,969. (No model.)

*To all whom it may concern:*

Be it known that I, EDWARD A. TRAPP, a citizen of the United States, and a resident of New York, in the county of New York and State of New York, have invented certain new and useful Improvements in Bicycles, of which the following is a specification.

The invention relates to improvements in bicycles, and pertains particularly to novel means or supports for maintaining a safety-bicycle in an upright position after the rider has brought the same to a rest. The supports made the subject of a part of this application comprise rods which extend downward from suitable operating mechanism and are locked one at each side of the rear wheel of the machine, and when said supports are in their lower position they will maintain the bicycle with the rider thereon, and when said supports are in their upper position they are entirely free of the ground and in no way interfere with the regular operation of the machine.

My present invention provides supporting-rods of novel form, novel means for mounting said rods, and novel mechanism for operating said rods, all of which will be fully described hereinafter and are illustrated in the accompanying drawings, in which—

Figure 1 is an end elevation of a bicycle constructed in accordance with and embodying the invention, the bicycle proper being illustrated by dotted lines and the parts constituting the present invention being illustrated in one position by full lines and in their other position by dotted lines. Fig. 2 is a side elevation of the rear portion of a bicycle constructed in accordance with and embodying the features of my present invention, the bicycle proper being illustrated by dotted lines. Fig. 3 is an enlarged detached side elevation, partly in section, of a portion of the upper front frame of the bicycle and forms in effect a continuation of the view illustrated in Fig. 2. Fig. 4 is an enlarged side elevation of the sprocket-wheel and levers by which the supporting-rods are operated. Fig. 5 is a top view of same. Fig. 6 is an enlarged detached side elevation of the sprocket-wheel which receives the lower portion of the chain used to operate the supporting-rods, the dotted lines in this figure also indicating the means for locking said sprocket-wheel when the supporting-rods are in their upper position and also when they are in their downward position. Fig. 7 is an enlarged top view of the spring-latch by which the sprocket-wheel shown in Fig. 6 is locked against rotation. Fig. 8 is a detached side elevation of a portion of the latch-blade shown in Fig. 7. Fig. 9 is a top view of the sprocket-wheel illustrated in Fig. 6. Fig. 10 shows an edge and side view, respectively, of the bearing in which the upper end of the side supporting-rod is swiveled. Fig. 11 is an elevation, looking at the rear of the bicycle, of one of the said supporting-rods. Fig. 12 is an elevation, looking at the side of the machine, of one of the said rods. Fig. 13 shows the side of a swiveled sleeve through which a part of the supporting-rods pass and within which, by means of a spiral rib, they are given an axial motion. Fig. 14 is a side elevation of same. Fig. 15 is a top view of same. Fig. 16 is a detached side elevation of the foot-treadle by which the rider is enabled, through the chain-and-sprocket mechanism, to elevate the said supporting-rods. Fig. 17 is an end view of same, and Fig. 18 is a detached side and edge view of a link forming one of the details of the mechanism.

In the drawings, A designates the usual frame of a "safety-bicycle;" B, the rear wheel therefor; D, the saddle, and E E the said supporting-rods embodying the invention made the subject of this application. The rods E E are arranged one at each side of the rear wheel B, and they are confined at about their center within the swiveled sleeves F, while at their upper ends they are swiveled within the bearings G, pivotally secured to the outer ends of the levers or cranks H H, by which the rods E E may be raised or lowered at will. The levers or cranks H H are operated by the novel means hereinafter described and claimed; but since said rods E E are of novel form and have a novel operation they will be individually described at once. Each rod E is practically straight, although on an inclined line, from its upper end *a* (see Figs. 1 and 3) to the point *b*, where said rod is turned outward laterally and inclines downwardly to the point *d*, at which the rod E turns forward slightly in order to bring its lower end or wheel *e* centrally below or slightly in front of the vertical line of the axle C of the rear wheel B, as indicated in Fig. 3. The rods E correspond exactly with one another and, as illustrated in Fig. 2, they incline rearwardly as well as outward laterally and at about their middle portion are held within the sleeves F F, which are formed with the spiral groove or rib I and have at their center the stem J, which forms the pivot upon which said sleeves F are enabled to have a pivotal movement from a central point. The sleeves F are by means of the said stems J and nuts K (for details see Figs. 13, 14, and 15) secured to the plate L, fastened upon the rear portion of the frame A of the machine in advance of the rear axle C. Those portions of the rods E which are confined within the sleeves F are formed with the spiral ribs M, which travel in the spiral grooves I of the sleeves F, and the object of this construction is to enable said sleeves F not only to guide and swivel on the stems J with the rods E, but to force said rods E to have an axial motion during their outward and downward movements. During the upward movement of the rods E the spiral ribs M, acted upon by the spiral grooves I, cause said rods E to turn axially within said sleeves F and turn the lower portions of said rods E below the point b inward toward the rear wheel B, as indicated by the dotted lines in Fig. 1, whereby said rods E are brought in out of the way. During the downward movement of the said rods E the spiral grooves I of the sleeves F, acting upon the spiral ribs M on the rods E, cause the latter to have a reverse axial motion within the sleeves F, and thereby said rods E during their downward motion are caused to turn their lower portions outward laterally to the position in which they are illustrated in Fig 1, in which figure it will be observed that the wheels e or lower ends of the rods E are outward at a substantial distance from the wheel B and are entirely capable of firmly supporting the said wheel in its upright position, the said rods operating as secure and effective braces, preventing said wheel from falling over either to one side or to the other. During the upward and downward movements of the rods E the sleeves F have a pivotal movement upon the central stems J, and the rods E have an axial motion at the same time within said sleeves. The sleeves F have a free action upon the stems J, since the latter are at the center of said sleeves F and prevent any binding of the sleeves during the upward and downward movements of the rods E. The form and mounting of the rods E are such that the lower ends when in their lower positions are either in line with or slightly in advance of the vertical line of the center of the wheel B, and in view of this location and arrangement of parts I am enabled to secure a very effective support for the wheel, the two rods E and the front wheel of the "safety" forming in effect the three legs of a tripod.

The upper ends of the rods E carry the nuts N at opposite sides of the inner plate O, as shown by full lines in Fig. 1 and dotted lines in Fig. 10. The rods E pass upward through the lower end of the bearing or hanger G and through the plate O, being held within said bearing or hanger G and permitted to turn axially therein by means of the nuts N. The bearings or hangers G correspond with one another at opposite sides of the rear wheel B, and they are, by means of the pins Q, pivotally secured to the lower or outer ends of the levers or crank-arms H H, which at their upper and inner ends are rigidly mounted upon the transverse shaft R, mounted in bearings S, over and slightly in advance of the center of the rear wheel B. The bearings S will be of any suitable form and will be sustained from the usual frame A of the machine. The shaft R is provided at one end with the sprocket-wheel T, and said shaft R is encompassed by the spiral spring V, whose tension is, as illustrated in Fig. 5, exerted to throw the arms H H, with the rods E, downward. When the sprocket-wheel T and shaft R are turned upward and toward the front of the safety, the crank-arms H turn upward and lift the rods E E from their lower to their upward position, and when the parts of the mechanism are released, so that the shaft R and sprocket-wheel T will turn rearward and downward under the influence of the spring V, the crank-arms H will force the rods E E downward to the position in which they are illustrated by full lines in Figs. 1 and 2. The sprocket-wheel T has arranged upon it the sprocket-chain W, which extends around the lower sprocket-wheel X, located above the pedal-crank shaft, as shown in Figs. 2 and 9. The sprocket-wheel X is mounted on the shaft f and secured to a suitable bracket g, applied to the usual frame A in any suitable manner, and said sprocket-wheel X is provided with an outer flange h and with an integral inner surface i, terminating at one end in the stop j and at the other end with a stop k, while adjacent to said stop k said surface i is furnished with the series of teeth m. Adjacent to the stops j k the body of the wheel X is furnished with the holes n o, respectively, as shown by dotted lines in Fig. 6, and which at the proper time receive the latch-plate p to lock the sprocket-wheel X against rotation. The sprocket-wheel X has simply a partial rotation, the extent of its movement being from the stop j to the stop k and back to the stop j, this being sufficient to secure the elevation and depression of the rods E. The sprocket-wheel X is not utilized to drive the upper sprocket-wheel T, but as a means for locking the upper sprocket-wheel against rotation. The latch-blade p has its shank inclosed within the cylinder q and is provided within said cylinder with the coiled spring r, which exerts a constant tension on said latch-blade toward the surface i of the said sprocket-wheel X. The latch-blade p is movable within the cylinder q, and the latter is stationary upon the frame of the machine. The latch-plate p is forced toward the surface i of the sprocket-wheel X by means of the spring r and is only released from the sprocket-wheel X when the rider by manual action pulls on the cord s, connected with the said blade p and provided with a convenient handle t, as shown in Fig. 3. The cord s extends upward from the shank of the latch-blade p around the pulley w and the handle-bar x. It is to be understood, however, that I do not limit the invention to any particular position that may be given to the cord s. The rider by pulling on the cord s simply withdraws the latch-blade p into the casing q, and hence if this is done when the rods E are in their lower position the sprocket-wheel X will simply be thereby freed and may be caused to rotate under the action of the chain W by power applied either to said chain or to the upper sprocket-wheel T, and if when the rods E are in their upward position the latch-blade p is withdrawn into the casing q and free of the sprocket-wheel X the said sprocket-wheel will be freed, and at this time it will be rotated by reason of the fact that the weight of the rods E, coupled with the force of the spring V, will cause said rods E to descend and thereby drive the shaft R and upper sprocket-wheel T, the motion of the upper sprocket-wheel T being communicated through the chain W to the lower sprocket-wheel X. The power for elevating the rods E is applied by the rider by the pressure of his foot upon the treadle A', pivotally secured to the frame of the machine and connected at its upper end by a short piece of chain B' to the main chain W, geared on the sprocket-wheel T. The treadle A' is supported by a link C' at its front end, as shown in Fig. 2, and at its rear end, which passes upward and turns around the rear of the bar D' of the machine, is connected with the chain B', as clearly illustrated in Figs. 1 and 2. In order to retain and guide the rear portion of the treadle A', the said portion of the treadle is connected with a ring E', which is adapted to have a sliding motion upon the said bar D'. If the latch-blade b may be considered entirely free of the sprocket-wheel X, it will be seen that the rider by pressing upon the treadle A' with his foot will draw downward on the short piece of chain B', and thereby pull downward upon the upper section of the main sprocket-chain W, the effect of which will be to cause the upper sprocket-wheel T to turn upward and toward the front of the machine and through the shaft R and crank-arms H elevate the supporting-rods E E from the position shown by full lines in Fig. 1 to the position shown by dotted lines in said figure. The rider may retain the rods E E in their upward position by continuing the pressure of his foot upon the treadle A'; but since this would be inconvenient and impracticable the rider will, to maintain the rods E in their upward position, lock the sprocket wheels and chain against movement, and this he does by simply releasing his hold on the cord s, whereupon the spring r will drive the latch-blade against the surface i of the sprocket-wheel X, and said blade p will lock said sprocket-wheel by entering the hole n therein. When the rods E are in their upward position, the latch-blade p will strike against the stop j and enter the hole n, the sprocket-wheel X at such time being in position to permit of this result, and when the latch-blade p is housed within the hole n the sprocket-wheel X will be thereby locked against movement and will lock the chain W and upper sprocket-wheel T, whereby the rods E are maintained in their upper position. When it is desired to lower the rods E, the rider will simply draw on the cord s and pull the latch-blade p from the hole n thereof, whereupon the weight of the rods E, combined with the force of the spring V, will cause the rods E to descend, and their movement will, through the crank-arms H and shaft R, rotate the upper sprocket-wheel T and through the chain W the lower sprocket-wheel X, the latter moving until the stop j, leaving the latch-blade p, arrives at about the position in which it is illustrated in Fig. 6 and the hole o in said sprocket-wheel X arrives at a position about in line with the latch-blade p. The stop k on the sprocket-wheel X will limit the motion of the sprocket-wheel X by coming into contact with the latch-blade p, and hence the sprocket-wheel X has simply a limited movement. Upon the lowering of the rods E and the bringing of the hole o in the sprocket-wheel X into position the latch-blade p will enter said hole and thereby lock said sprocket-wheel against further movement, the result of this being that the chain W and upper sprocket-wheel T will be locked and the rods E will be firmly maintained in their lower position and in condition to securely support the rider. The latch-blade p and sprocket-wheel X thus lock the upper sprocket-wheel T, both when the rods E are in their upper position as well as when they are in their lower position. When the rods are in their upper position, the rider in order to lower them simply pulls on the handle t in order to free the lower sprocket-wheel; but when the rider desires to elevate the rods E he first pulls on the handle t to free the sprocket-wheel X and then presses with his foot upon the treadle A' in order to cause the chain W to elevate said rods E. Thus upon the elevation of the rods E E the rider will both draw on the cord s and press upon the foot-treadle A'; but in order to secure the lowering of said rods E the rider will simply withdraw the latch-blade p from the sprocket-wheel X in order to simply free the sprocket-wheel X and allow the rods E to automatically descend. As hereinbefore described, during the descent of the rods E they will be given an axial motion to turn their lower portions outward, and by means of the swivel-sleeves F and during their upward movement they will be given a reverse axial motion within said sleeves F in order to turn their lower ends inward toward the wheel B. That portion of the rods E carrying the spirals M may be in the form of a cast sleeve F', as denoted in the drawings, or the said spirals M will be formed in any other manner desired.

What I claim as my invention, and desire to secure by Letters Patent, is—

1. In combination with a bicycle, the supporting-rods extending downward one on each side thereof, the crank-shaft carrying cranks pivotally connected with said rods, the sprocket-wheel on said shaft, the additional or locking sprocket-wheel, the chain connecting said sprocket-wheels, the foot-treadle connected with said chain for effecting the elevation of said rods and the latch for engaging the locking sprocket-wheel to prevent movement in said chain and wheels; substantially as set forth.

2. In combination with the bicycle, the supporting-rods extending downward one on each side thereof, the crank-shaft carrying the cranks pivotally connected with the upper ends of said rods, the sprocket-wheel on said shaft, the additional sprocket-wheel, the chain connecting said sprocket-wheels and the foot-treadle suspended by a link at its front end and at its rear end connected with said chain for actuating the same; substantially as set forth.

Signed at New York, in the county of New York and State of New York, this 2d day of February, A. D. 1897.

EDWARD A. TRAPP.

Witnesses:
 CHAS. C. GILL,
 E. JOS. BELKNAP.